(12) United States Patent
Shao et al.

(10) Patent No.: US 9,795,971 B2
(45) Date of Patent: Oct. 24, 2017

(54) SEMI-ENCLOSED AIR CLEANER USED IN AN AIR-CONDITIONER

(71) Applicant: NINGBO DONGDA AIR-CONDITIONING EQUIPMENT CO., LTD., Ningbo, Zhejiang (CN)

(72) Inventors: Anchun Shao, Zhejiang (CN); Songchao Shao, Zhejiang (CN); Jun Wang, Zhejiang (CN)

(73) Assignee: Ningbo Dongda Air-Conditioning Equipment Co., Ltd., Ningbo, Zhejiang (CN)

( * ) Notice: Subject to any disclaimer, the term of this patent is extended or adjusted under 35 U.S.C. 154(b) by 151 days.

(21) Appl. No.: 14/662,819

(22) Filed: Mar. 19, 2015

(65) Prior Publication Data

US 2015/0266033 A1 Sep. 24, 2015

(30) Foreign Application Priority Data

Mar. 21, 2014 (CN) .......................... 2014 1 0106163

(51) Int. Cl.
*B03C 3/51* (2006.01)
*B03C 3/64* (2006.01)
(Continued)

(52) U.S. Cl.
CPC .............. *B03C 3/64* (2013.01); *B01D 53/323* (2013.01); *B03C 3/41* (2013.01); *B03C 3/47* (2013.01); *B01D 2258/06* (2013.01)

(58) Field of Classification Search
CPC combination set(s) only.
See application file for complete search history.

(56) References Cited

U.S. PATENT DOCUMENTS 4,662,903 A * 5/1987 Yanagawa ................. B03C 3/60
96/139
5,248,324 A * 9/1993 Hara ......................... B03C 3/09
96/37
(Continued)

FOREIGN PATENT DOCUMENTS

CN 202590958 12/2012
CN 203370644 1/2014
(Continued)

*Primary Examiner* — Duane Smith
*Assistant Examiner* — Sonji Turner
(74) *Attorney, Agent, or Firm* — Hamre, Schumann, Mueller & Larson, P.C.

(57) ABSTRACT

A semi-enclosed air purifier for an air-conditioner having stable quality, good air purification and dust removal, little generation of ozone, high efficiency, low cost, safety and convenience is provided. The semi-enclosed air purifier comprises a cartridge comprising an assembly of electrostatic generating strips, an anode connector of FBT, and a cathode connector of FBT. The assembly of electrostatic generating strips comprises electrostatic generating strips. The semi-enclosed electrostatic generating strip comprises a PET resin strip and a conductive strip. The assembly of electrostatic generating strips comprises two or more positive conductive strips and the same amount of negative conductive strips. Insulating spacers are provided between adjacent electrostatic generating strips.

14 Claims, 8 Drawing Sheets

(51) Int. Cl.
*B03C 3/41* (2006.01)
*B03C 3/47* (2006.01)
*B01D 53/32* (2006.01)

(56) References Cited

U.S. PATENT DOCUMENTS

| | | | | |
|---|---|---|---|---|
| 5,290,343 | A * | 3/1994 | Morita | B03C 3/86 |
| | | | | 96/39 |
| 5,403,383 | A * | 4/1995 | Jaisinghani | B03C 3/66 |
| | | | | 422/22 |
| 5,547,496 | A * | 8/1996 | Hara | B03C 3/025 |
| | | | | 96/79 |
| 5,993,521 | A * | 11/1999 | Loreth | B03C 3/12 |
| | | | | 96/69 |
| 8,580,017 | B2 * | 11/2013 | Noh | B03C 3/08 |
| | | | | 96/69 |
| 2002/0134665 | A1 * | 9/2002 | Taylor | B01D 53/32 |
| | | | | 204/164 |
| 2003/0005824 | A1 * | 1/2003 | Katou | B03C 3/12 |
| | | | | 96/35 |
| 2006/0016335 | A1 | 1/2006 | Cox et al. | |
| 2008/0314250 | A1 * | 12/2008 | Cowie | B03C 3/08 |
| | | | | 96/86 |
| 2012/0304862 | A1 * | 12/2012 | Taylor | B01D 53/268 |
| | | | | 96/8 |
| 2012/0312170 | A1 * | 12/2012 | Noh | B03C 3/08 |
| | | | | 96/86 |

FOREIGN PATENT DOCUMENTS

| | | | | |
|---|---|---|---|---|
| JP | 11207207 | A * | 8/1999 | |
| WO | WO 2010085253 | A1 * | 7/2010 | B03C 3/017 |

* cited by examiner

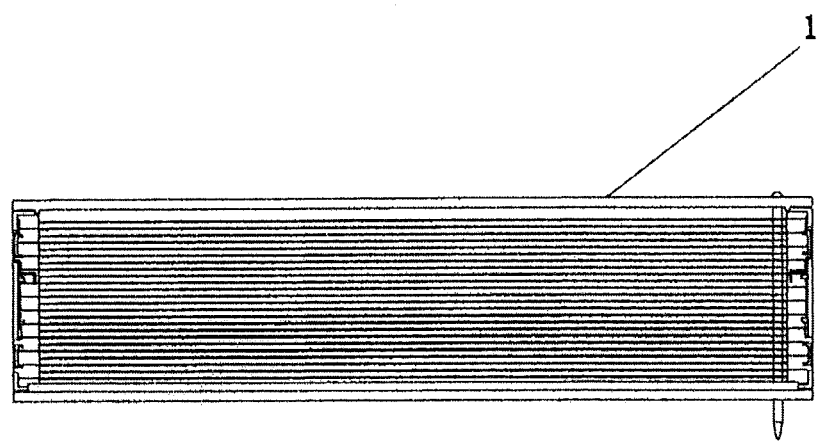
Fig. 1-1
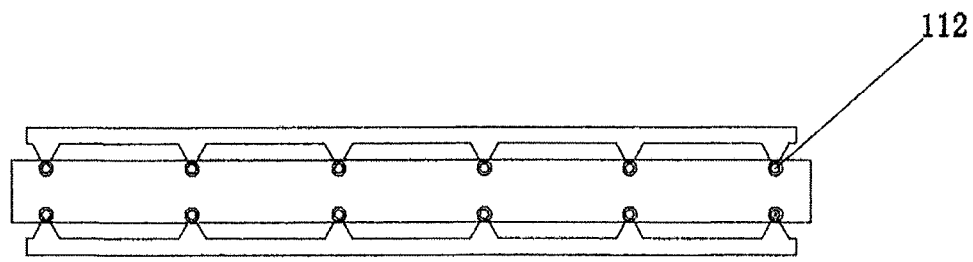
Fig. 1-2
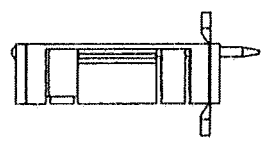 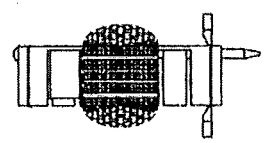
Fig. 1-3          Fig. 1-4

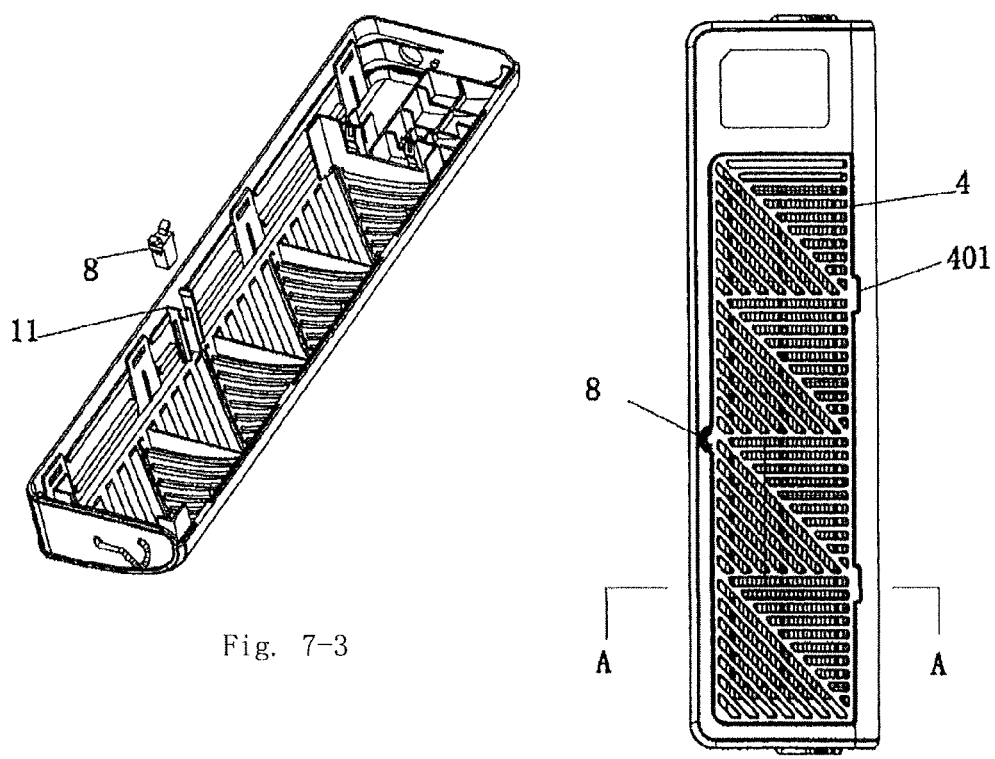
Fig. 7-3
Fig. 8-1
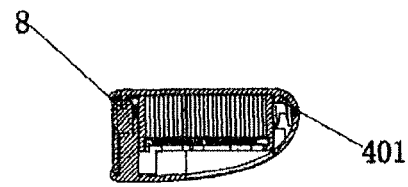
Fig. 8-2

SEMI-ENCLOSED AIR CLEANER USED IN AN AIR-CONDITIONER

FIELD OF THE INVENTION

The present invention relates to the technical field of air purification apparatus, particularly to an air purifier, and more particularly to a semi-enclosed air purifier used in combination with an air-conditioner.

BACKGROUND

People become more and more concerned about the indoor air quality in the past decade since the national standard "Indoor Air Quality" entered into force. The pollution caused by the broadly used air-conditioners as well as building materials and furniture materials with poor quality has created a severe issue that must be addressed immediately. Currently, the PM 2.5 particle has become a major problem of indoor air pollution. Particularly, when considering the ever nationwide large areas of severe fog and haze which took place from December 4 to 7, 2013, the problem of PM 2.5 should be solved as quickly as possible. PM 2.5 refers to particles with the diameter of less than or equal to 2.5 micrometers, which can enter the people's lungs. Compared with the coarser particles, PM 2.5 particle has a smaller size, contains large amounts of toxic and hazardous substances, and can stay in the atmosphere for a long time and transport a long distance, and thus has a greater impact on human health and environmental quality of the atmosphere.

The main source of PM 2.5 comes from outdoors, it pervades everywhere due to its small size. According to the monitoring results of July and August 2013 in Beijing, indoor PM 2.5 pollution has a tendency to exceed the outdoor pollution. Since people mainly live and work in the room, the indoor PM 2.5 pollution has reached a very serious level. There are several ways to remove the PM 2.5 particles, of which the most reliable and the most commonly used method is filtration. Washing and electrostatic precipitation are also common methods. But all these dust removing methods have shortcomings. Filtration is the simplest method with a low cost. However, filtration of PM 2.5 particles requires at least medium efficient filter, which suffers a large resistance and is easily blocked, thus has to be regularly cleaned or replaced. The washing method is also easy to implement, but it produces excessive amounts of moisture that cause indoor humidity level rise which is a kind of pollution for the humid regions of the world. The electrostatic precipitation method is effective not only in dust removal, but also in antivirus sterilization; however, it produces ozone during operation, which is lethal to humans. The serious outdoor air pollution, especially the PM 2.5 pollution will be introduced indoor with the new air, thereby aggravating damage on people. The introduction of new air so as to degrade indoor pollution and to solve the problem of indoor oxygen supply is the primary task among Chinese imperatives.

The typical spread fully naked electrostatic air purifier that is widely employed employs naked metal as a generator for high electrostatic field and is one of the ideal products used for dust removal, sterilization, disinfection in health care system due to its significant effect of dust removal. However, the naked electrostatic air purifier produces too much ozone for use in closed room or places where people exit. Europe and the United States have expressly provided that the naked electrostatic air purifier should not be used in places where people exit. In order to solve the severe recurring problems of PM 2.5 pollution in China, many domestic experts specializing in electrostatics have been studying such naked metal generators. They have devised an electrostatic precipitator with circular columns as negative electrodes and acicular metal columns as positive electrodes. The electrostatic precipitator produces ozone below the national standard requirements during operation. The emission of ozone reaches 0.01 mg/m$^3$ after startup for 40 minutes and reaches 0.16 mg/m$^3$, the national standard value, after startup for 16 hours. When the ozone content of the room itself is taken into account, the increment of 0.01 mg/m$^3$ per hour is still a excessive enough to be considered a source of contamination. Also, the precipitator loses suction force when power off, thereby those dust particles adsorbed on the negative electrode fall within the precipitator and will be blown into the room when the precipitator is started up again. Thus, the precipitator loses its purification function.

BRIEF SUMMARY OF THE INVENTION

The present invention is aimed at solving the deficiencies of the prior art described above, including inconsistent quality, poor dust removal, producing harmful ozone, low performance, complex processing, high costs, poor safety performance, high price, and being inconvenient to use. The present invention provides a semi-enclosed air purifier used in combination with an air-conditioner, which achieves the purposes of stable quality, good purification effect, little generation of harmful ozone, high efficiency, relatively simple process, low production cost, good safety performance, low price and ease of use.

A semi-enclosed air purifier used in combination with an air-conditioner is provided. The semi-enclosed air purifier comprises a cartridge, an inlet window and an outlet window. The cartridge comprises an assembly of electrostatic generating strips, an endplate A, an endplate B, a positive conductive terminal, a negative conductive terminal, an anode connecter of FBT, and a cathode connecter of FBT.

The assembly of electrostatic generating strips comprises semi-enclosed electrostatic generating strips, insulating spacers, a side plate A, a side plate B and fixing posts. Each of the semi-enclosed electrostatic generating strips comprises a PET resin strip and a conductive strip and each conductive strip comprises wide segments, narrow segments, point discharge structures, and a leading terminal.

The conductive strip comprises positive conductive strips and negative conductive strips. The semi-enclosed electrostatic generating strips being provided with the positive conductive strips and the semi-enclosed electrostatic generating strips provided with the negative conductive strips are provided at intervals.

The insulating spacers are provided between the semi-enclosed electrostatic generating strips provided with the positive conductive strips and the semi-enclosed electrostatic generating strips provided with the negative conductive strips.

The semi-enclosed electrostatic generating strips, the insulating spacers, the side plate A and the side plate B are fixedly connected together, thereby forming the assembly of electrostatic generating strips, wherein the leading terminals of the positive conductive strips and the leading terminals of the negative conductive strips are located at opposite ends of the assembly of electrostatic generating strips, respectively.

The positive conductive terminal and the negative conductive terminal are provided at opposite ends of the assembly of electrostatic generating strips respectively. The anode connecter of FBT is connected to the positive conductive terminal and the cathode connecter of FBT is connected to the negative conductive terminal; and when energized, the assembly of electrostatic generating strips generates an electric field and adsorbs air pollutants.

Preferably, the point discharge structures comprise main discharge ends and auxiliary discharges ends, wherein the main discharge ends are provided at the both sides of the middle of the wide segments, and the auxiliary discharge ends are provided at four corners of each of wide segments.

Preferably, the PET resin strip is made of polymer resin material, and the conductive strip is made of silver paste in conductive ink.

Preferably, the PET resin strip has a length of 50-800 mm, and a width of 10-50 mm.

Preferably, there is a distance of 1.0-5.0 mm between the adjacent positive conductive strips and negative conductive strips.

Preferably, the wide segment has a width of 8-40 mm; the narrow segment has a width of 1-20 mm, and the width of the leading terminal is the same as that of the narrow segment.

Preferably, the assembly of electrostatic generating strips comprises 8 or more fixing posts and 4 or more insulating spacers.

Preferably, each of the semi-enclosed electrostatic generating strips comprises five wide segments of equal length and four narrow segments of equal length and at each of the both ends and every narrow segment of every electrostatic generating strip, two fixing post perforation are provided at the top and the bottom thereof respectively. Preferably there are six insulating spacers between two semi-enclosed adjacent said electrostatic generating strips, and two through holes for fixing post are provided at a top and bottom of each insulating spacer, respectively, each position on the side plate A and side plate B corresponding to the though holes of the semi-enclosed electrostatic generating strip is provided with a though hole for fixing post, and the electrostatic generating strips, the insulating spacers, the side plate A and the side plate B are fixedly connected together through the fixing posts passing through the through holes.

Preferably, the PET resin strip has a length of 235 mm and a width of 19 mm; the wide segment of the conductive strip has a width of 10 mm and the narrow segment of the conductive strip has a width of 2 mm.

Preferably, the semi-enclosed air purifier further comprises a rear plate, a DC terminal, a latch lock, elastic pieces and hooks, and the semi-enclosed air purifier is provided with bounding frames on both sides, fixing frames for the FBT, snap spring slots at both ends and rear snap slots; the cartridge is in snap connection with the bounding frames on both sides; the FBT is in snap connection with the fixing frames; the elastic pieces are mounted in the snap ring slots at both ends respectively, and the rear plate is in snap connection with the rear slots; and the rear plate is provided with a DC terminal hole and latch slot, wherein the DC terminal is provided in the DC terminal hole; the latch is snapped into the latch slot, and the air outlet window is locked through the latch.

Preferably, the semi-enclosed electrostatic generating strips provided with the positive conductive strips and the semi-enclosed electrostatic generating strips provided with the negative conductive strips are of the same quantity.

Preferably, the distance between adjacent positive and negative conductive strips is 1.7 mm.

In another embodiment, an air-conditioner product assembly is provided, wherein the assembly comprises an air-conditioner and the semi-enclosed air purifier according to the above embodiments.

Preferably, the air-conditioner product assembly further comprises a smart socket and a smart socket remote controller.

In another embodiment, a semi-enclosed air purifier used in combination with an air-conditioner together with a "smart socket" and a "smart socket remote controller" is provided. the semi-enclosed air purifier comprises a cartridge, a base, an inlet window, and an outlet window.

The cartridge is an air purifying cartridge and further comprises a rear plate, a FBT, a DC terminal, a latch lock, two elastic pieces and two hooks.

The cartridge comprises an assembly of electrostatic generating strips, an endplate A, an endplate B, a positive conductive terminal, a negative conductive terminal, an anode connecter of FBT, a cathode connecter of FBT, and the assembly of electrostatic generating strips comprise semi-enclosed electrostatic generating strips, 4 or more insulating spacers, a side plate A, a side plate B and 8 or more fixing posts.

Each of the semi-enclosed electrostatic generating strips comprises a PET resin strip and a conductive strip. The PET resin strip is made of polymer resin material and has a length of 50-800 mm and a width of 10-50 mm, and the conductive strip is made of silver paste in conductive ink, which is applied onto one side surface of the PET resin strip by using a printing or coating process.

The conductive strip has an overall shape of a continuous strip with alternate wide segments and narrow segments wherein number of the wide segments is an odd number which is 3 or more. The conductive strip has pointed ends for discharge which comprising main discharge ends and auxiliary discharge ends, and wherein said main discharge ends are provided at both sides and in the middle of the wide segments and form a sharp corner shape while the auxiliary discharge ends are provided at four corners of each of wide segment and form an arc shape, and wherein the wide segments have a width of 8-40 mm and the narrower segments have a width of 1-20 mm, and one end of the conductive strip is a leading terminal which has a same width as that of the narrow segments.

An embodiment having 2 or more positive conductive strips and same number of negative conductive strips, wherein the semi-enclosed electrostatic generating strips provided with positive conductive strips and the semi-enclosed electrostatic generating strips provided with negative conductive strips are arranged at intervals. The insulating spacers are positioned between the adjacent semi-enclosed electrostatic generating strips provided with positive conductive strips and the semi-enclosed electrostatic generating strips provided with negative conductive strips, wherein the leading terminal of the positive conductive strip is at one side of the conductive strip and the leading terminal of the negative conductive strip is at the other side of the conductive strip, and a distance between the adjacent positive conductive strip and the negative conductive strip is 1.0-5.0 mm. The side plate A and the side plate B are positioned at both sides of the purifier, and the semi-enclosed electrostatic generating strips, the insulating spacers, the side plate A and the side plate B are fixedly connected together through fixing posts, thereby forming the assembly of electrostatic generating strips;

The leading terminals exposed at both ends of the assembly of electrostatic generating strips are welded in parallel into a monopole and filled with a silicone rubber so as to be fixed insulatively, wherein the two monopoles are incased into the endplate A and the endplate B, respectively.

The positive conductive terminal and the anode connecter of FBT are mounted at one end of the assembly of electrostatic generating stripes, and the negative conductive terminal and the cathode connecter of FBT are mounted at the other end of the assembly of electrostatic generating strips.

When a fan of the air conditioner is in operation, air enters an electric field generated at both sides of the assembly of electrostatic generating strips through the inlet window and pollutants in the air are adsorbed onto the PET resin strips by the electrostatic field so as to purify air.

Under the inlet window and inside of the purifier, bounding frames on both sides, fixing frames for FBT, snap spring slots at both ends and rear snap slots are provided. The cartridge is in snap connection with the bounding frames of the inlet window. The FBT is in snap connection with the fixing frames. The two elastic pieces are mounted in snap ring slots at both ends respectively and in snap connection thereto. The rear plate is in snap connection with the rear slots. The DC terminal is installed in a DC terminal hole provided in the rear plate. The latch is snapped into a latch slot of the rear plate, and the rear part of the outlet window is locked through the latch slot. An outlet window snap is provided at the front surface of the outlet window. A base slot is provided at upper end of the base. The front surface of the outlet window is connected to the base by snapping the outlet window snap into the base slot. One end of the hook is inserted into a hole provided at each end of the rear plate and the other end of the hook is hung on a corresponding position of the inlet window of the air conditioner.

The PET resin strip has a length of 235 mm and a width of 19 mm. The wide segments of the conductive strip have a width of 10 mm and the narrow segments of the conductive strip have a width of 2 mm. The distance between the adjacent positive conductive strip and negative conductive strip is 1.7 mm.

The semi-enclosed electrostatic generating strips comprise five wide segments having an equal length and four narrow segments having another equal length. At each of the both ends of the semi-enclosed electrostatic generating strips and at every narrow segment in each of the semi-enclosed electrostatic generating strips, two through holes for fixing post are provided at top and bottom thereof respectively. There are 6 insulating spacers and two through holes for fixing post are provided at top and bottom of each of the insulating spacers respectively. Each of the side plate A and the side plate B is provided with through holes at positions corresponding to the through holes on the semi-enclosed electrostatic generating strips. The semi-enclosed electrostatic generating strips, the insulating spacers, the side plate A and the side plate B are fixedly connected together through the fixing posts passing through the through holes for fixing post.

The semi-enclosed electrostatic generating strips, the insulating spacers, the side plate A and the side plate B are connected by the fixing posts, tightly pressed together, and fixed after the fixing posts are thermal welded. The fixing posts before welding remain a weld length of 2-5 mm after an excess part thereof is cut off.

Said silicone rubber is KE-45 silica gel.

The "smart socket" is inserted into a power socket of the air-conditioner. Power plugs of the air-conditioner and the purifier are both inserted into the "smart socket"; and the purifier operates in an operating mode based on the "smart socket" and "smart socket remote controller".

The principle of the present invention is: the present invention is a semi-enclosed electrostatic adsorption air purifier of the type of strong electric field with two electrodes separated and semi-enclosed isolates the corresponding electric fields, rather than electric field and double naked electric field corresponding to fully-closed electrodes and fully naked electrodes respectively. In other words, only one side of the conductive strip is closed by PET resin coating forming a semi-enclosed conductive strip, rather than forming a fully-closed conductive strip by coating PET resin on both sides of the conductive strip, which avoids producing ozone by the naked electrodes. The present invent employs the isolated discharge principle. The two electrodes that produce ozone are separated, therefore maintaining the ability of the discharge of two fully naked electrodes. The lateral point discharge is enhanced through discharging at two electrodes locally. In addition to the electric field produced between two electrodes, the sharp corners at the side of the electrode will produce stronger power lines, which widen the width of the electric field and enhance the strength of the lateral magnetic field, therefore strengthening the dust purification effect.

The PET resin strips which broader than the conductive trips, can isolate the electric field and prevents the replacement reaction of conductive strips and oxygen under power lines, thereby prevents the generation of ozone. The PET polymer resin material has the function of dust adsorption and still remains micro electrical properties after loss of power, which allows it to continue absorbing dust and prevent the dust from going back inward the room after loss of power. Also, more pollutants can be absorbed and dust holding capacity of the purifier is increased.

Compared with the prior art, the beneficial effects of the present invention include:

(1) High stability: the core structure of the present invention is the cartridge employing semi-enclosed isolating corresponding electric field, which reduces ozone produced by exposed electrodes. The two electrodes that produce ozone are separated according to isolated discharge principle. The lateral point discharge is enhanced through discharging at two electrodes locally. PET resin strips can isolate electric field, which further prevent the generation of ozone. PET polymer resin material can absorb more contaminants, which increases the dust holding capacity.

(2) Good dust purification effect: the present product has a strong dust suction effect. According to the testing results conducted by Chinese Center for Disease Control and Prevention, the clean air delivery rate (CADR) of the semi-enclosed air purifier used in combination with an air-conditioner reaches 149.4 $m^3/h$, much higher than the national standard specified value 2 $m^3/hw$, increasing 24.5% over that of fully naked electrostatic air purifier, 120% over that of fully enclosed air purifiers. Besides, the purification efficiency for PM 2.5 is 99.3%/h.

(3) Little generation of harmful ozone: it only produces ozone of 0.017−0.013=0.003 $mg/m^3$, which is just 1.85% of the national standard value; even the purifier continuously purifies air for 53 hours, the production amount of ozone would not reach the national quality standard value of 0.16 $mg/m^3$.

(4) High efficiency: the purifier only consumes a power of 1 W used for the FBT generating electrostatic field and reaches a high efficiency of 149 $m^3/hw$, much higher than the national standard of 2 $m^3/hw$, which is the maximum efficiency of effectiveness of air purifiers ever known.

(5) Simplified process, low production costs: the present invention employs coating machining, which reduces processing steps and equipments of thermoplastics, plastic injection and injection molding, and reduces the costs of the fan system and housing; the total cost of the present invention is only 30% of the air purifiers having the same amount of clean air with that of the present invention.

(6) Small size, low noise: the semi-enclosed electrostatic generating strip is very thin and the thickness of which is no more than 0.5 mm, while the distance between electrostatic strips and air channels is more than 1.5 mm, thus the air drag is so small that it will not affect the ventilation amount of the air-conditioner. The volume of the present invention is reduced by more than two-thirds with respect to air purifiers in the prior art having the same amount of air purification since there is no fan system. Further, The present invention is an air purifier producing the least noise since there is no noise produced by fans.

(7) Good safety performance: since electric power is weak, the cartridge would not harm people after loss of power. Further, due to the protective measures are taken, the performance of the electrodes will not be affected even in water, thus the cartridge can be cleaned in weak alkaline solution after loss of power, and after drying, the cartridge still maintain the original dust and dust absorption function.

(8) Low price, ease to use: this machine is equipped with a "smart socket" and a "smart socket remote controller", which omits installation process and sophisticated control, whereby ordinary users can afford to buy the machine and find it easy to use.

BRIEF DESCRIPTION OF THE DRAWINGS

FIG. 1-1 shows a front view of a cartridge of a semi-enclosed air purifier used in combination with an air-conditioner according to the present invention.

FIG. 1-2 shows a top view of the cartridge of the semi-enclosed air purifier used in combination with the air-conditioner.

FIG. 1-3 shows a left view of the cartridge of the semi-enclosed air purifier used in combination with the air-conditioner.

FIG. 1-4 shows the distribution of power lines of electrostatic field in one embodiment of a semi-enclosed air purifier used in combination with an air-conditioner.

FIG. 2-1 shows a front view of a semi-enclosed electrostatic generating strip.

FIG. 2-2 shows a left view of the semi-enclosed electrostatic generating strip.

FIG. 3 shows an exploded view of the cartridge.

FIG. 4 shows a perspective view of the cartridge.

FIG. 6-1 shows a top perspective view of the air purifier.

FIG. 6-2 shows a bottom perspective view of the air purifier.

FIG. 7-1 shows a perspective view of the air purifier without an inlet window, in which can be seen the arrangement of bounding frames on both sides, snap slots at both ends, a FBT and a fixing frame of FBT.

FIG. 7-2 shows a perspective view of the air purifier without an outlet window, in which can be seen the arrangement of the rear snap slot.

FIG. 7-3 shows a perspective view of the air purifier, in which can be seen the arrangement of latch and latch slot.

FIG. 8-1 shows a front view of an air purifier, in which can be seen the installment of the outlet window.

FIG. 8-2 shows a section view along line A-A in FIG. 8-1.

Figures 1, 2:
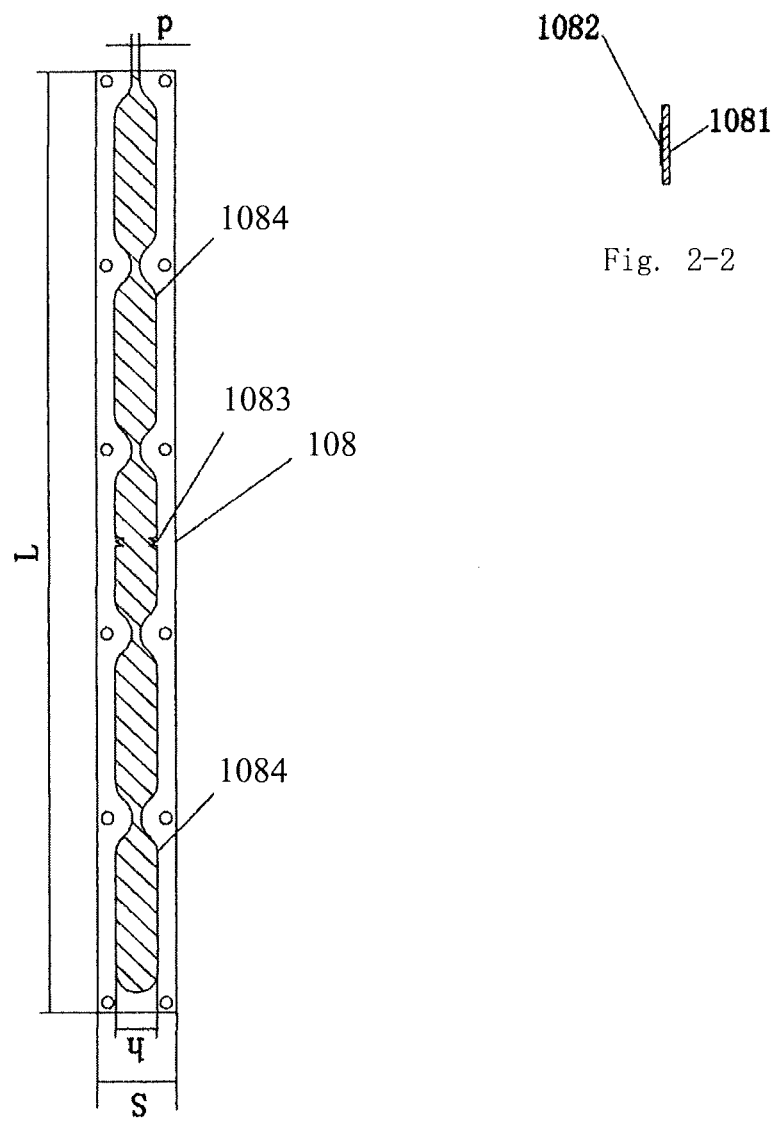
Figure 3:
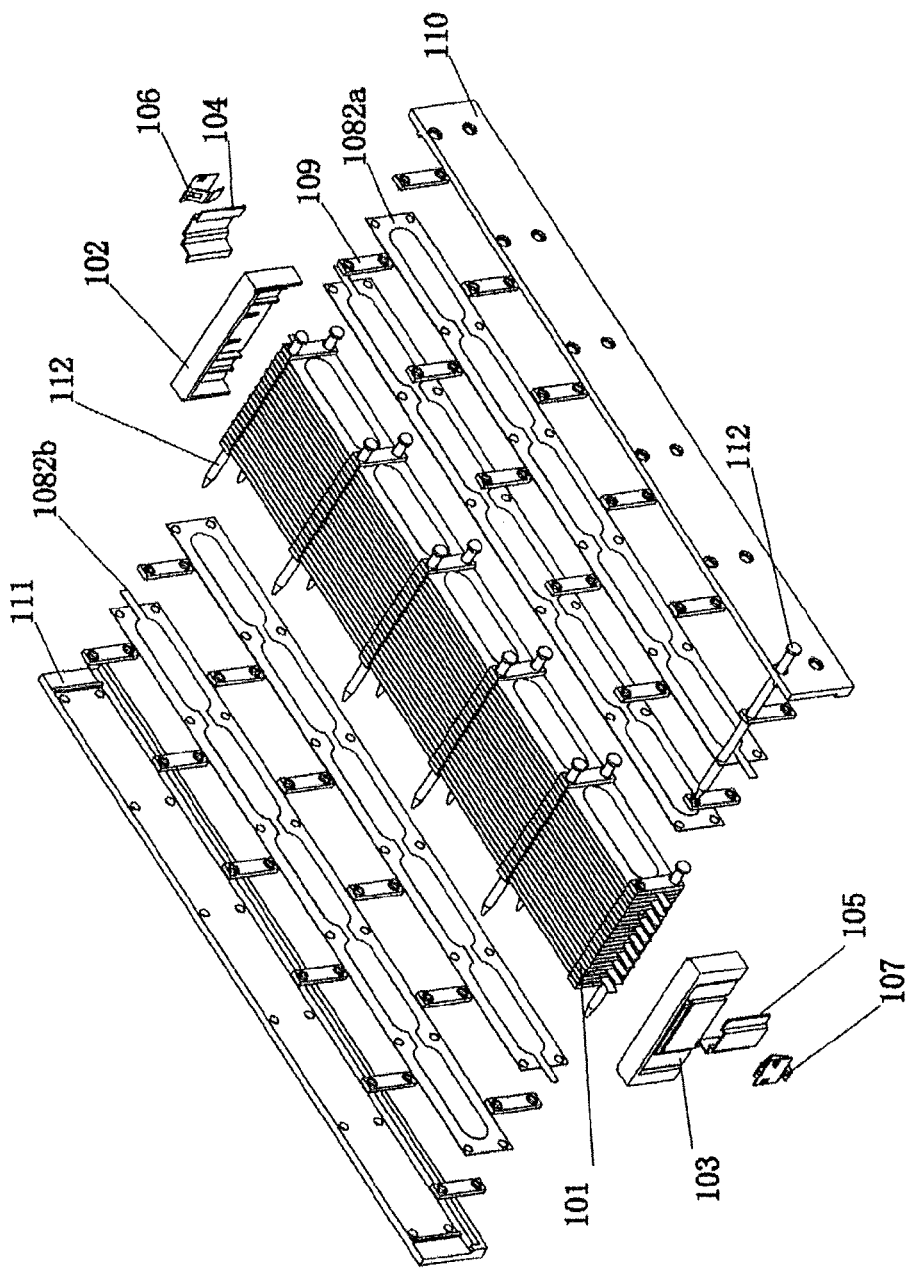
Figure 4:
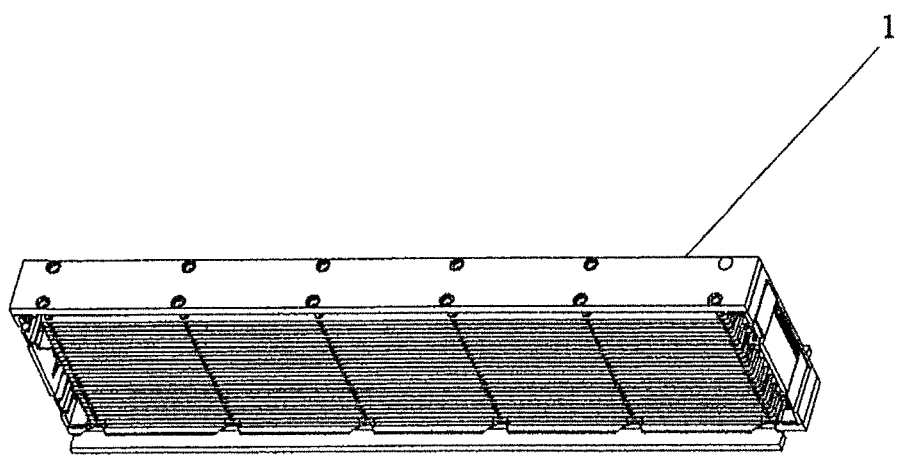
Figure 5:
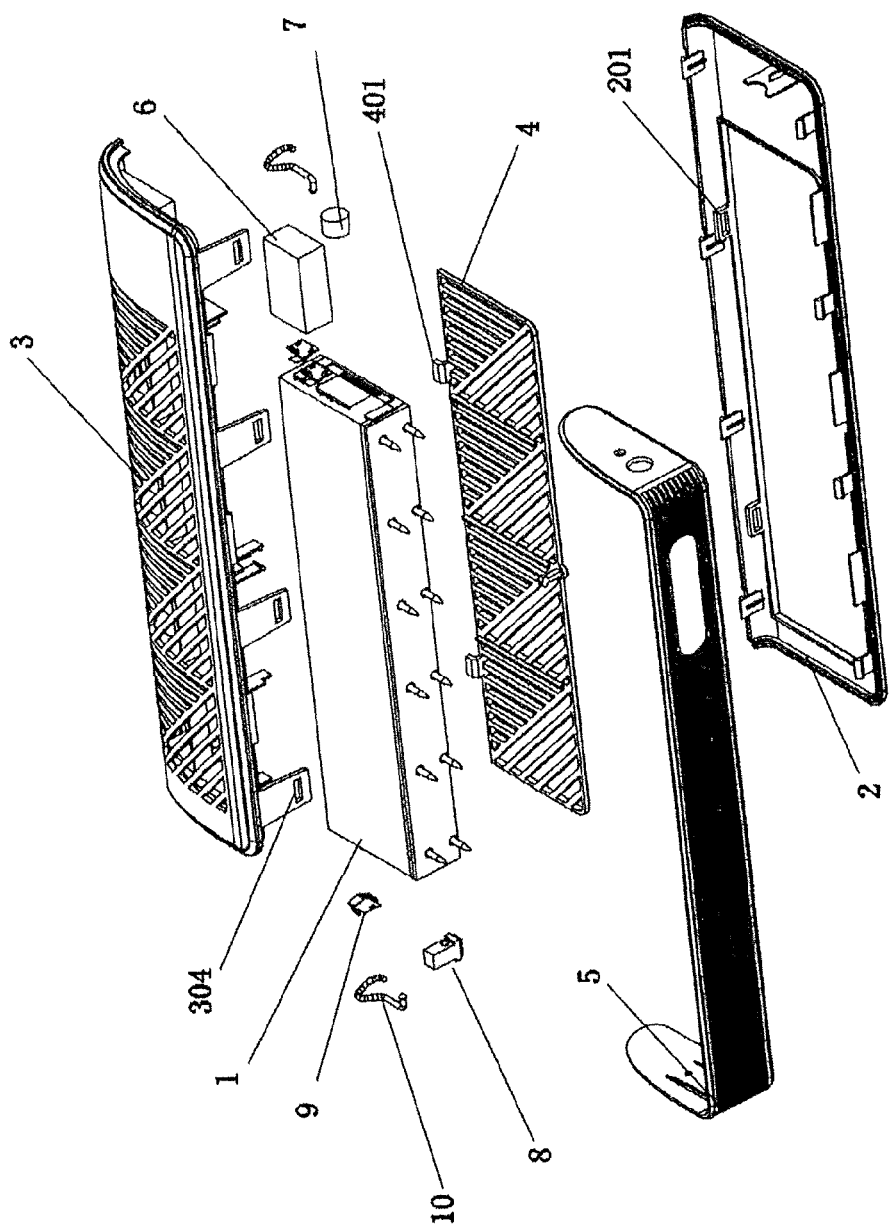
FIG. 5 shows an exploded view of the air purifier.
Figures 1, 6:
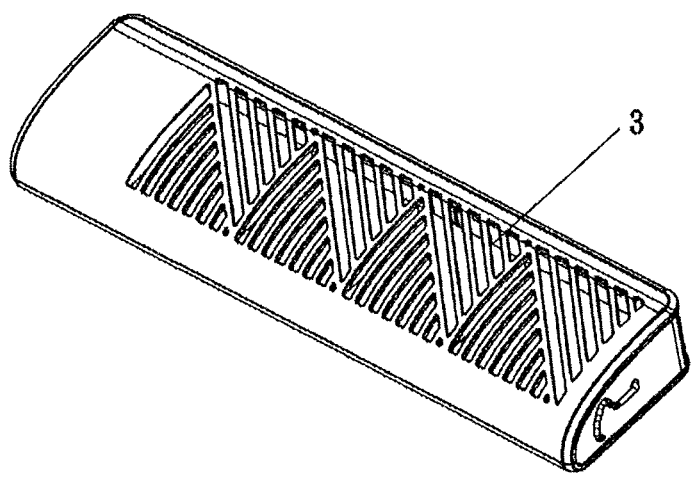
Figures 2, 6:
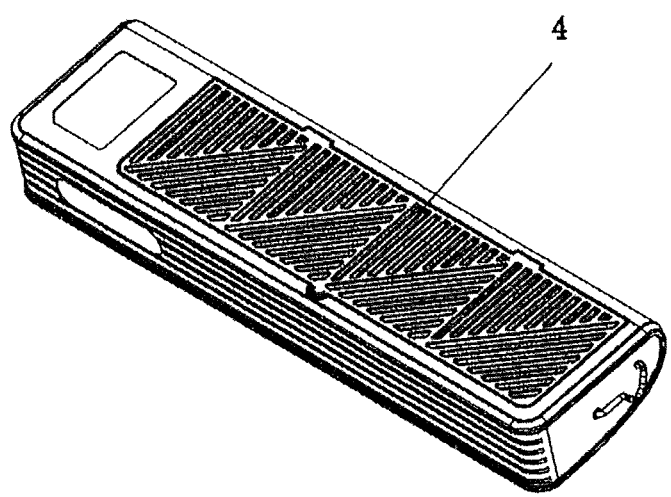
Figures 1, 7:
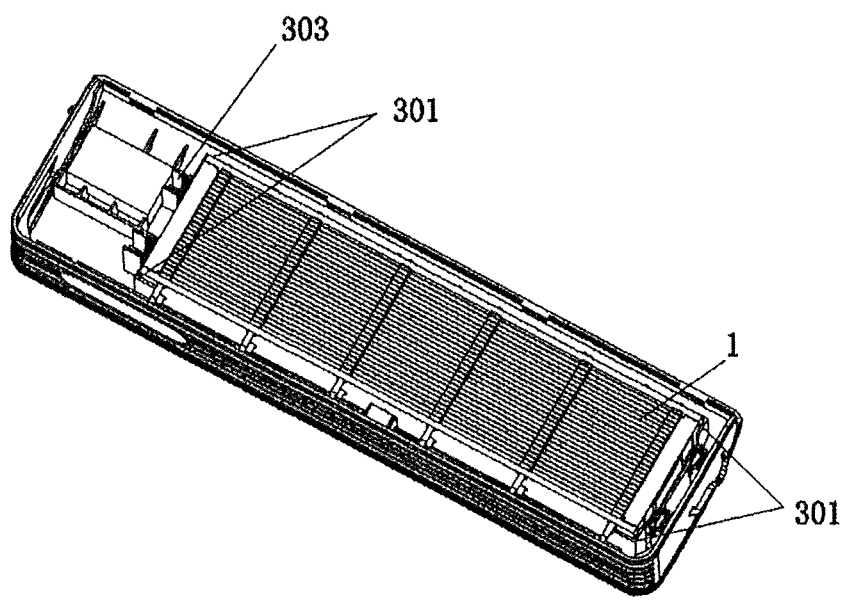
Figures 2, 7:
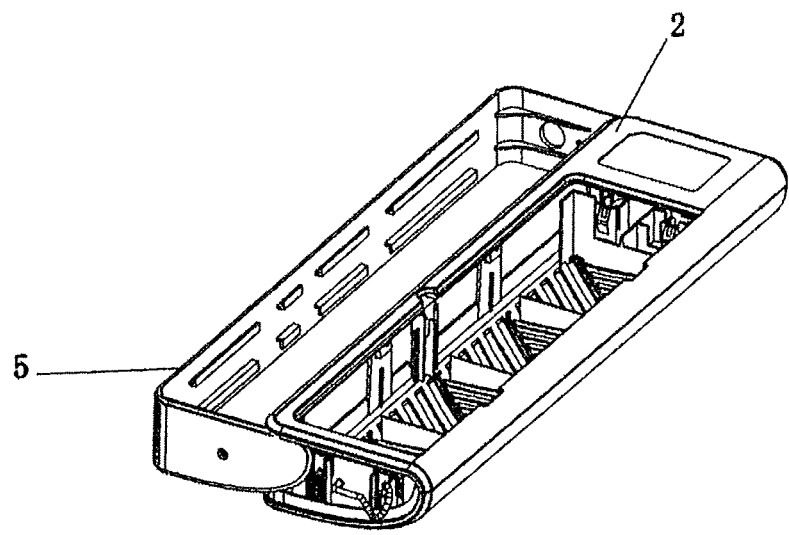

The following features, with corresponding reference numbers, are described and/or shown in the drawings: 1 cartridge, 101 assembly of electrostatic generating strips, 102 endplate A, 103 endplate B, 104 positive conductive terminal, 105 negative conductive terminal, 106 anode connecter of FBT (Fly Back Transformer), 107 cathode connecter of FBT, 108 electrostatic generating strip, 1081 PET resin strip, 1082 conductive strip, 1082*a* positive conductive strip, 1082*b* negative conductive strip; 1083 main discharge end, 1084 auxiliary discharge end, 109 insulating spacer, 110 side plate A, 111 side plate B, 112 fixing post, 2 base, 201 base snap slot, 3 inlet window, 301 bounding frame, 302 fixing frame for FBT, 303 snap slots, 304 inlet window slot, 4 outlet window 401, outlet window snap, 5 rear plate, 6 FBT, 7 DC terminal, 8 latch, 9 elastic piece 10, hook 12, and 11 latch slot.

DETAILED DESCRIPTION

The present invention is further described hereinafter in connection with the accompanying drawings and specific embodiments, which do not limit the scope of the present invention.

As shown in FIG. 1-1 to FIG. 8-2, a semi-enclosed air purifier used in combination with an air-conditioner (also referred as air-conditioner-companioned air purifier, hereinafter referred as purifier) is used in conjunction with an air-conditioner (not shown) after being combined with a "smart socket" (not shown) and a "smart socket remote controller" (not shown). The purifier comprises a cartridge 1, a base 2, an inlet window 3, an outlet window 4, a rear plate 5, a FBT 6, a DC terminal 7, a latch 8, two elastic pieces 9 and two hooks 10.

The cartridge 1 comprises an assembly of electrostatic generating strips 101, an endplate A 102, an endplate B 103, a positive conductive terminal 104, a negative conductive terminal 105, anode connecter of FBT 106, cathode connecter of FBT 107. The assembly of the semi-enclosed electrostatic generating strips 101 comprise electrostatic generating strips 108, 4 or more insulating spacers 109, side plate A 110, side plate B 111 and 8 or more fixing posts 112.

The semi-enclosed electrostatic generating strip 108 comprises a PET resin strip 1081 and a conductive strip 108/2, wherein the PET resin strip 1081 is made of polymer resin material and the conductive strip 1082 is made of silver paste in conductive ink, which is applied onto one side surface of the PET resin strip 1081 through printing or coating process. Certainly, the conductive strip 1082 may also be made of copper paste, carbon paste in conductive ink or copper foil. When the conductive strip is made of copper paste or carbon paste in conductive ink, the copper paste or carbon paste is applied to one side surface of the PET resin strip 1081 trough printing or coating process. When the conductive strip is made of copper foil, the copper foil is adhered on the front surface of the PET resin strip 1081 trough paste process. The PET resin strip has a length L of 235 mm and a width S of 19 mm.

The overall shape of the conductive strip 1082 is a continuous strip with alternate wide and narrow segments, comprising five wide segments and four narrow segments. The specific shape of the conductive strip 1082 is a shape that a point discharge will happen (point discharge shape) comprising a main discharge end 1083 and an auxiliary discharge end 1084, wherein the main discharge end 1083 is provided at the both sides of the middle of the wide segments, forming a sharp corner and the auxiliary electro-discharge end 1084 is provided at the four corners of every wide segment, forming an arc-shape. The wide segment has a width h of 10 mm and the narrow segment has a width d of 2 mm. One end of the conductive strip 1082 is a leading terminal which has a same width as that of the narrow segment.

There are thirteen positive conductive strips 1082a and thirteen negative conductive strips 1082b. Electrostatic generating strips with the positive conductive strips 1082a and electrostatic generating strips with the negative conductive strips 1082b are provided alternately. Insulating spacers 109 are provided between the semi-enclosed electrostatic generating strips provided with the positive conductive strips 1082a and the semi-enclosed electrostatic generating strips provided with the negative conductive strips 1082b. The leading terminals of the positive conductive strips 1082a are at the left side of the conductive strip 1082, the leading terminals of the negative conductive strips 1082b are at the right side of the conductive strip 1082, and the distance between adjacent positive conductive strips 1082a and negative conductive strips 1082b is 1.7 mm.

The leading terminals exposed at both ends of the assembly of electrostatic generating strips 1082 are welded into a monopole in parallel and filled with silicone rubber so as to be fixed insulatively. The two wielded monopoles are incased into the endplate A 102 and the endplate B 103 respectively. The positive conductive terminal 104 and the anode connecter of FBT 106 are provided at the right side of the assembly of electrostatic generating stripes 101. The negative conductive terminal 105 and the cathode connecter of FBT 107 are provided at the left side of the assembly of electrostatic generating stripes 101.

When the fan of the air-conditioner is running, air enters the electric field generated at both sides of the assembly of electrostatic generating strips 108 through the inlet window and pollutants in the air are adsorbed on the PET resin strips 1081 under the effect of the electrostatic field, thereby achieving the purposes of air purification.

Under the inlet window 3, the purifier is provided with bounding frames 301 on both sides, fixing frames for the FBT 302, snap ring slots 303 at both ends and rear slots 304. The cartridge 1 is in snap connection with the bounding frames 301 of the inlet window 3. The FBT 6 is in snap connection with the fixing frames 302. The two elastic pieces 9 are mounted in the snap ring slots 303 at both ends respectively and in snap connection thereto. The rear plate 5 is in snap connection with the rear slots 304. The DC terminal 7 is installed in a DC terminal hole provided in the rear plate 5. The latch 8 is snapped into the latch slot 11 of the rear plate 5, and the rear part of the outlet window 4 is locked through the latch 8. An outlet window snap 401 is provided at the front surface of the outlet window 4. A base slot 201 is provided at base 2. The front surface of the outlet window is connected to the base 2 by snapping the outlet window snap 401 into the base slot 201. One end (bend head) of the hook 10 is inserted into a hole provided at each end of the rear plate, and the other end (curved part) of the hook is hung on a corresponding position on a screen of the inlet window of the air-conditioner (not shown).

One electrostatic generating strip 108 has five wide segments of equal length and four narrow segments of equal length. At each of the both ends and each of narrow segments of every electrostatic generating strip, two through holes for fixing post are provided at the top and the bottom thereof respectively. That is, every electrostatic generating strip is provided with twelve through holes for fixing post. there are six insulating spacers 109 between two adjacent electrostatic generating strips, and two through holes for fixing post are provided at the top and the bottom of each insulating spacer respectively. Each of the side plate A 110 and side plate B 111 is provided with twelve through holes for fixing post at positions corresponding to those on electrostatic generating strips 108. Fixing posts pass through the corresponding through holes for fixing post provided on the semi-enclosed electrostatic generating strips 108, insulating spacers 109, side plate A 110 and side plate B 111 so that the semi-enclosed electrostatic generating strips 108, insulating spacers 109, side plate A 110 and side plate B 111 are pressed tightly together and form the assembly of electrostatic generating strips 101. The fixing post 112 are thermal welded and before welding remains a weld length of 3 mm after an excess part thereof is cut off.

Preferably, the silicone rubber is KE-45 silica gel. Of course, the silicone rubber can also be SCSIL553-W-type A/B, 704 or 703 silica gel.

The "smart socket" (not shown) is inserted into the power socket (not shown) of the air-conditioner. The power plugs of the air-conditioner and the purifier are both inserted into the "smart socket". The purifier operates in an operating mode based on the "smart socket" and "smart socket remote controller"

No fan system is provided on the purifier and the air flow is provided by the fan of an indoor unit of an air-conditioner.

The assembly process is as follows:

(1) Snapping the cartridge 1 into the bounding frames 301 at both sides of the inlet window;

(2) Snapping the FBT into the fixing frames 302 of the inlet window;

(3) Snapping the two elastic pieces 9 into the snap ring slots at both ends of the inlet window, respectively;

(4) Snapping the rear plate 5 into the rear slots 304;

(5) Installing the DC terminal 7 into the DC terminal hole of the rear plate;

(6) Snapping the latch 8 into the latch slot 11 of the rear plate;

(7) Snapping the outlet window snap 401 into the base slots 201;

(8) Inserting the terminal of hook into the jacks at both ends of the rear plate and hanging the curved part of the hook at the corresponding position of the inlet window of the air-conditioner.

When pollutants on PET resin strip 1081 reach 20% to 50%, "smart socket remote controller" will remind "Please clean the cartridge". At this point, the power should be turned off, and then the cartridge can be removed and cleaned with cleaning fluids. After blow-dry, the cartridge can be reloaded for subsequent use.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A semi-enclosed air purifier used in combination with an air-conditioner, comprising:
   an inlet window;
   an outlet window; and
   a cartridge comprising an assembly of electrostatic generating strips, an endplate A, an endplate B, a positive conductive terminal connected to an anode of a Fly Back Transformer (FBT), and a negative conductive terminal connected to a cathode of the Fly Back Transformer (FBT), wherein the assembly of electrostatic generating strips comprises semi-enclosed electrostatic generating strips, insulating spacers, a side plate A, a side plate B, and fixing posts;

wherein each of the semi-enclosed electrostatic generating strips comprises a PET resin strip and a conductive strip, and each conductive strip comprises wide segments, narrow segments, point discharge structures, and a leading terminal, wherein each conductive strip is configured as a positive conductive strip or a negative conductive strip, and the semi-enclosed electrostatic generating strips provided with the positive conductive strips and the semi-enclosed electrostatic generating strips provided with the negative conductive strips are provided at intervals, wherein the insulating spacers are provided between the semi-enclosed electrostatic generating strips provided with the positive conductive strips and the semi-enclosed electrostatic generating strips provided with the negative conductive strips, wherein at least the semi-enclosed electrostatic generating strips, the insulating spacers, the side plate A, and the side plate B are fixedly connected together, thereby forming the assembly of electrostatic generating strips, wherein the assembly is affixed together such that the leading terminals of the positive conductive strips and the leading terminals of the negative conductive strips are located at opposite ends of the assembly of electrostatic generating strips, wherein the positive conductive terminal and the negative conductive terminal are provided at opposite ends of the assembly of electrostatic generating strips wherein when energized, the assembly of electrostatic generating strips generates an electric field and adsorbs air pollutants, and wherein the point discharge structures comprise main discharge ends and auxiliary discharges ends, the main discharge ends are provided at both sides of a middle of the wide segments, and the auxiliary discharge ends are provided at four corners of each of wide segments.

2. The semi-enclosed air purifier according to claim 1, wherein the PET resin strip comprises a polymer resin material, and the conductive strip comprises a silver paste in conductive ink.

3. The semi-enclosed air purifier according to claim 1, wherein the PET resin strip has a length of 50-800 mm, and a width of 10-50 mm.

4. The semi-enclosed air purifier according to claim 1, wherein
the semi-enclosed electrostatic generating strips provided with the positive conductive strips and the semi-enclosed electrostatic generating strips provided with the negative conductive strips are provided at intervals such that a distance between each adjacent positive conductive strip and negative conductive strip is 1.0-5.0 mm.

5. The semi-enclosed air purifier according to claim 1, wherein the wide segment has a width of 8-40 mm, the narrow segment has a width of 1-20 mm, and the width of the leading terminal is the same as the width of the narrow segment.

6. The semi-enclosed air purifier according to claim 1, wherein the assembly of electrostatic generating strips comprises eight or more fixing posts and four or more insulating spacers.

7. The semi-enclosed air purifier according to claim 1, wherein,
each of the semi-enclosed electrostatic generating strips comprises five wide segments of equal length and four narrow segments of equal length, each electrostatic generating strip has top and bottom perforations, the perforations being provided at the top and bottom at each end and at each narrow segment of the electrostatic generating strips, six insulating spacers are provided between each adjacent two semi-enclosed electrostatic generating strips, and two through holes for fixing posts are provided at a top and bottom of each insulating spacer, each position on the side plate A and side plate B corresponding to the through holes of the semi-enclosed electrostatic generating strip is provided with a though hole for the fixing post, and the electrostatic generating strips, the insulating spacers, the side plate A, and the side plate B are fixedly connected together through the fixing posts passing through the through holes.

8. The semi-enclosed air purifier according to claim 3, wherein,
the PET resin strip has a length of 235 mm and a width of 19 mm, and
the wide segment of the conductive strip has a width of 10 mm and the narrow segment of the conductive strip has a width of 2 mm.

9. The semi-enclosed air purifier according to claim 1, wherein,
the semi-enclosed air purifier further comprises a rear plate, a DC terminal, a latch lock, elastic pieces and hooks, and the semi-enclosed air purifier is provided with bounding frames on both sides, fixing frames for the FBT, snap spring slots at both ends, and rear snap slots;

the cartridge is in snap connection with the bounding frames on both sides; the FBT is in snap connection with the fixing frames; the elastic pieces are mounted in the snap ring slots at both ends respectively, and the rear plate is in snap connection with the rear slots; and the rear plate is provided with a DC terminal hole and latch slot, wherein the DC terminal is provided in the DC terminal hole; the latch is snapped into the latch slot, and the air outlet window is locked through the latch.

10. The semi-enclosed air purifier according to claim 1, wherein the cartridge has an equal number of the semi-enclosed electrostatic generating strips provided with the positive conductive strips and the semi-enclosed electrostatic generating strips provided with the negative conductive strips.

11. The semi-enclosed air purifier according to claim 4, wherein
the distance between each adjacent positive conductive strip and negative conductive strip is 1.7 mm.

12. A air-conditioner product assembly wherein the assembly comprises an air-conditioner and the semi-enclosed air purifier according to claim 1.

13. A semi-enclosed air purifier used in combination with an air-conditioner comprising an air purifying cartridge, a base, an inlet window, and an outlet window, a rear plate, a fly back transformer (FBT), a DC terminal, a latch lock, two elastic pieces, and two hooks, the cartridge comprising:
an assembly of electrostatic generating strips;
an endplate A;
an endplate B;
a positive conductive terminal connected to an anode of the fly back transformer (FBT); and a negative conductive terminal connected to a cathode of the fly back transformer (FBT), wherein the assembly of electrostatic generating strips comprises semi-enclosed electrostatic generating strips, four or more insulating spacers, a side plate A, a side plate B, and eight or more fixing posts, each of the semi-enclosed electrostatic generating strips comprises a PET resin strip and a conductive strip, the PET resin strip comprising polymer resin material and has a length of 50-800 mm and a width of 10-50 mm, and the conductive strip comprising silver paste in conductive ink, which is applied onto one side surface of the PET resin strip by using a printing or coating process, the conductive strip has an overall shape of a continuous strip along a length of the PET resin strip with alternating wide segments and narrow segments wherein the number of the wide segments is an odd number which is three or more, and the wide segments having a width of 8-40 mm and the narrower segments having a width of 1-20 mm, the conductive strip has pointed ends for discharging comprising main discharge ends and auxiliary discharge ends, the main discharge ends are provided at both sides and in the middle of the wide segments such that the discharge ends form a sharp corner shape and the auxiliary discharge ends are provided at four corners of each wide segment such that the auxiliary discharge ends form an arc shape, and one end of the conductive strip includes a leading terminal having the same width as the narrow segments, the assembly of electrostatic generating strips comprises two or more positive conductive strips and same number of negative conductive strips, wherein the semi-enclosed electrostatic generating strips provided with positive conductive strips and the semi-enclosed electrostatic generating strips provided with negative conductive strips are arranged at intervals such that a distance between each adjacent positive conductive strip and negative conductive strip is 1.0-5.0 mm, and the insulating spacers are positioned between the adjacent semi-enclosed electrostatic generating strips provided with positive conductive strips and the semi-enclosed electrostatic generating strips provided with negative conductive strips, the conductive strips being configured such that the leading terminals of the positive conductive strips are all located at one side of the conductive strips and the leading terminal of the negative conductive strips are located at an opposite side of the conductive strips, the side plate A and the side plate B are positioned at both sides of the purifier, and the electrostatic generating strips, the insulating spacers, the side plate A and the side plate B are fixedly connected together through fixing posts thereby forming the assembly of electrostatic generating strips, the leading terminals exposed at both ends of the assembly of electrostatic generating strips are welded in parallel into a monopole and each monopole being incased into a respective endplate A and endplate B, the positive conductive terminal is mounted at one end of the assembly of electrostatic generating stripes, and the negative conductive is mounted at the other end of the assembly of electrostatic generating strips, and when a fan of the air conditioner is in operation, air enters an electric field generated at both sides of the assembly of electrostatic generating strips through an inlet window and pollutants in the air are adsorbed onto the PET resin strips by the electrostatic field so as to purify air.

14. The semi-enclosed air purifier according to claim 13, further comprising:

under the inlet window and inside of the purifier, bounding frames on both sides, fixing frames for the FBT, and snap spring slots at both ends and rear snap slots, wherein the cartridge is in snap connection with the bounding frames of the inlet window, the FBT is in snap connection with the fixing frames, the two elastic pieces are mounted in respective snap ring slots at both ends and in snap connection thereto, the rear plate is in snap connection with rear slots, the DC terminal is installed in a DC terminal hole provided in the rear plate, the latch lock is snapped into a latch slot of the rear plate, and a rear part of the outlet window is locked through the latch slot, an outlet window snap is provided at a front surface of the outlet window, a base slot is provided at upper end of the base, the front surface of the outlet window is connected onto the base by snapping the outlet window snap into the base slot, one end of a respective hook is inserted into a hole provided at each end of the rear plate and, and a second end of each respective hook is hung on a corresponding position of the inlet window of the air conditioner.

* * * * *